United States Patent
Wang et al.

(10) Patent No.: US 8,196,263 B2
(45) Date of Patent: Jun. 12, 2012

(54) HINGE

(75) Inventors: Hung-Chi Wang, Taipei (TW); Chin-Te Chiu, Taipei (TW); Mei-Chuan Yang, Taipei (TW)

(73) Assignee: Cheng Uei Precision Industry Co. Ltd., Taipei (TW)

( * ) Notice: Subject to any disclaimer, the term of this patent is extended or adjusted under 35 U.S.C. 154(b) by 328 days.

(21) Appl. No.: 12/609,506

(22) Filed: Oct. 30, 2009

(65) Prior Publication Data
US 2011/0099761 A1    May 5, 2011

(51) Int. Cl.
*E05C 17/64* (2006.01)
(52) U.S. Cl. .................. 16/338; 16/342; 361/679.27
(58) Field of Classification Search .......... 16/338, 16/342, 337, 375, 387, 298, 273; 455/575.3; 379/433.13; 361/679.27; 248/917–923
See application file for complete search history.

(56) References Cited

U.S. PATENT DOCUMENTS

| | | | | |
|---|---|---|---|---|
| 4,490,884 A * | 1/1985 | Vickers | .................. | 16/338 |
| 5,031,275 A * | 7/1991 | Chiang | .................. | 16/263 |
| 5,632,066 A * | 5/1997 | Huong | .................. | 16/338 |
| 5,682,645 A * | 11/1997 | Watabe et al. | .................. | 16/338 |
| 6,085,388 A * | 7/2000 | Kaneko | .................. | 16/338 |
| 6,378,171 B1 * | 4/2002 | Suzuki et al. | .................. | 16/342 |
| 6,470,532 B2 * | 10/2002 | Rude | .................. | 16/335 |
| 6,584,646 B2 * | 7/2003 | Fujita | .................. | 16/342 |
| 7,895,711 B2 * | 3/2011 | Shen | .................. | 16/342 |
| 2004/0134033 A1 * | 7/2004 | Raines et al. | .................. | 16/342 |
| 2005/0102796 A1 * | 5/2005 | Lee et al. | .................. | 16/342 |
| 2008/0184527 A1 * | 8/2008 | Chao | .................. | 16/221 |
| 2011/0072620 A1 * | 3/2011 | Wang et al. | .................. | 16/342 |

* cited by examiner

*Primary Examiner* — William L. Miller
(74) *Attorney, Agent, or Firm* — WPAT, P.C.; Anthony King

(57) ABSTRACT

A hinge includes a first connector which has a hollow pivotal sleeve with a channel penetrating therethrough, a coupling flap and a locating strip spaced from each other in a parallel relation and connected with two opposite edges of the channel respectively, a resilient tube pivotally received within and circumferentially biasing against the pivotal sleeve to produce a friction resistance force therebetween, two second connectors fastened to two opposite ends of the resilient tube, and a fastening element for holding the locating strip and the coupling flap closely together and adjust a space between the locating strip and the coupling flap to further regulate the friction resistance force. So the first connector may be positioned at any desired angle relative to the second connectors by means of the friction resistance force between the resilient tube and the pivotal sleeve.

7 Claims, 3 Drawing Sheets

HINGE

BACKGROUND OF THE INVENTION

1. Field of the Invention

The present invention generally relates to a hinge, and more particularly to a hinge for a foldable electronic appliance such as a notebook computer, a flip phone, and the like.

2. The Related Art

Conventionally, a foldable electronic appliance, such as a notebook computer, a flip phone and so on, has a host body and a display apparatus pivoted to the host body by means of a hinge. The display apparatus can be unfolded when in use, and be folded to couple on the host body when not in use so as to reduce the size to facilitate storing and carrying.

Referring to FIG. 7, a traditional hinge includes a second connector 20' having a pintle 21', a first connector 10' pivoted to the pintle 21' by means of a pivotal flange 11' thereof, a plurality of positioning detents 30' and a plurality of resilient spacers 40' alternately wore to the pintle 21'. Finally a free end of the pintle 21' is engaged with a nut 50' to preclude disengagement of the pivotal flange 11', the positioning detents 30' and the resilient spacers 40' from the pintle 21'. The first connector 10' further has a latch finger 12' near to the pintle 21'. One of the positioning detents 30' is acted as a braking element 31' buckled with the latch finger 12'. The second connector 20' is secured to the host body and the first connector 10' is secured to the display apparatus so that the display apparatus may be swiveled about the pintle 21' for folding and unfolding relative to the host body. In the process of opening the display apparatus relative to the host body, the first connector 10' is driven to swivel about the pintle 21' that further drives the pivotal flange 11' and the braking element 31' to swivel relative to other positioning detents 30' and the resilient spacers 40' for generating friction resistance force thereamong. So the display apparatus is positioned relative to the host body by means of the friction resistance force.

However, the traditional hinge has too many components and a complicated assembly, and takes a high cost. So it would be desirable to provide an improved hinge capable of overcoming the foregoing problems.

SUMMARY OF THE INVENTION

An object of the present invention is to provide a hinge adapted to be connected between a display apparatus and a host body of a foldable electronic appliance for permitting the display apparatus to be swiveled relative to the host body. The hinge includes a first connector, a resilient tube, two second connectors and a fastening element. The first connector has a hollow pivotal sleeve with a channel penetrating therethrough to break off the pivotal sleeve, a coupling flap and a locating strip which are spaced from each other in a parallel relation and connected with two opposite edges of the channel respectively. The coupling flap is fastened to the display apparatus of the electronic appliance. The resilient tube is pivotally received within and circumferentially biases against the pivotal sleeve of the first connector to produce a friction resistance force therebetween. The two second connectors are fastened to two opposite ends of the resilient tube and further fastened to the host body of the electronic appliance so that the display apparatus may be positioned at any desired angle relative to the host body by means of the friction resistance force between the resilient tube and the pivotal sleeve. The fastening element is adapted to hold the locating strip and the coupling flap closely together and adjust a space between the locating strip and the coupling flap to further regulate the friction resistance force between the resilient tube and the pivotal sleeve.

As described above, the hinge of the present invention mainly includes the first connector, the resilient tube, the second connectors and the fastening element, and utilizes the friction resistance force between the resilient tube and the pivotal sleeve of the first connector to make the display apparatus positioned at any desired angle relative to the host body. So the hinge of the present invention has simple structure and assembly, and further reduces the manufacture cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
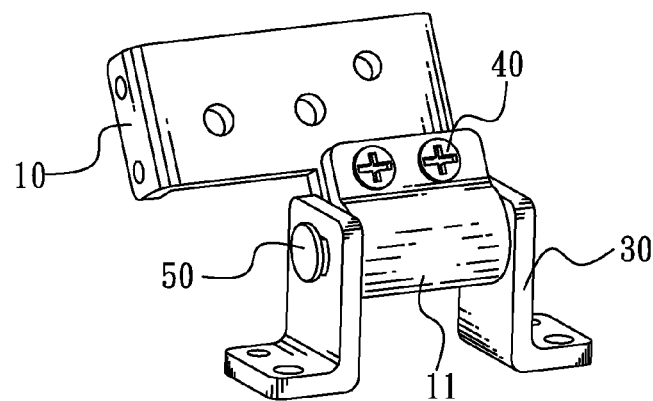
FIG. 1 is a perspective view of a hinge in accordance with the present invention.
Figure 2:
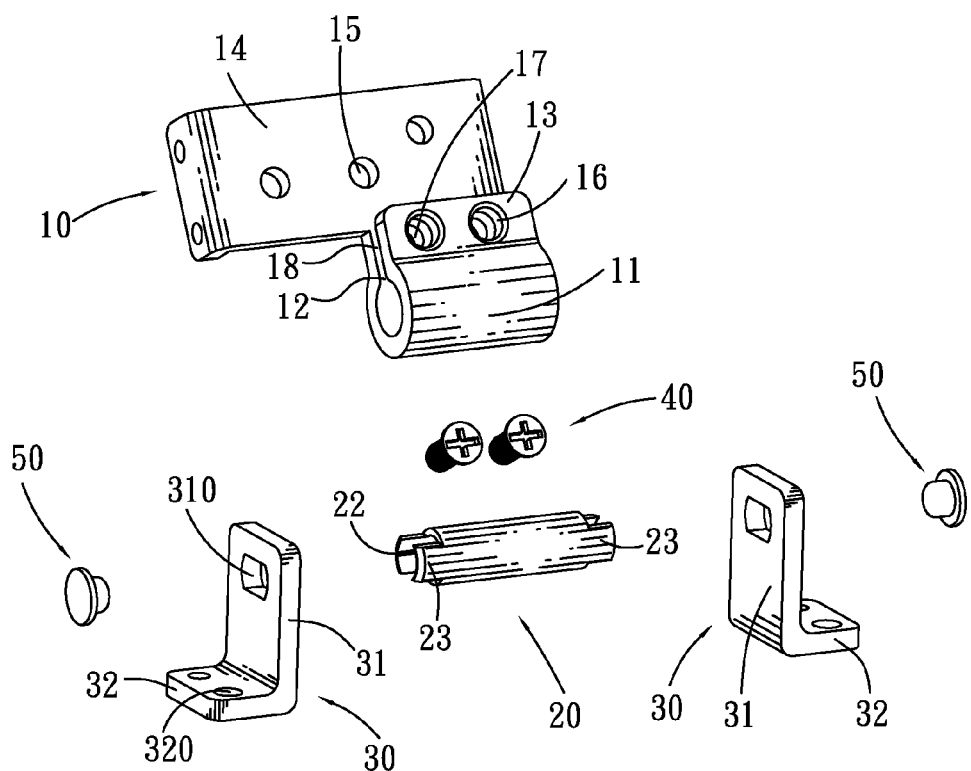
FIG. 2 is an exploded perspective view of the hinge of FIG. 1.

With reference to FIG. 1 and FIG. 2, a hinge in accordance with the present invention includes a first connector 10, an elongated resilient tube 20, two second connectors 30, a plurality of fastening elements 40 and two resilient stoppers 50.

Figure 3:
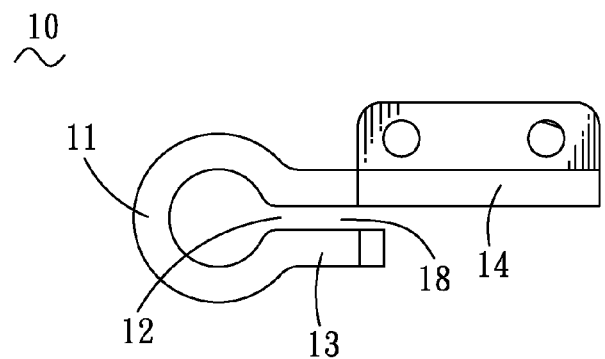
FIG. 3 is a lateral view of a first connector of the hinge of FIG. 1.

Referring to FIG. 2 and FIG. 3, the first connector 10 has a hollow cylindrical pivotal sleeve 11 with a channel 12 opened along a generatrix thereof and penetrating therethrough to break off the pivotal sleeve 11. The first connector 10 further includes a substantially flat coupling flap 14 and a flat locating strip 13 which are parallel to and spaced from each other to be connected with two opposite edges of the channel 12 respectively and define a space 18 therebetween communicating with the channel 12. The locating strip 13 defines a plurality of first locking holes 16 and the coupling flap 14 defines a plurality of second locking holes 17 one-to-one corresponding to the first locking holes 16. The coupling flap 14 further defines a plurality of fastening holes 15 each penetrating therethrough.

Figure 4:
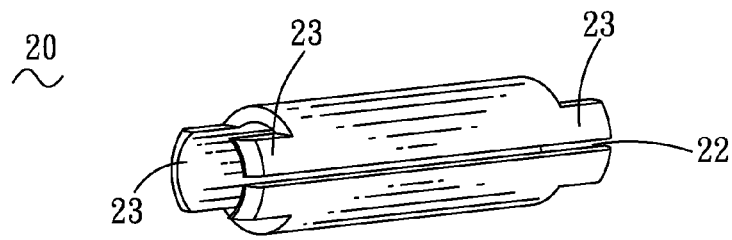
FIG. 4 is a perspective view of a resilient tube of the hinge of FIG. 1.

Referring to FIG. 2 and FIG. 4, the resilient tube 20 is of hollow cylindrical shape and defines a slot 22 extending along a generatrix thereof and penetrating therethrough to break off the resilient tube 20 for enhancing the resiliency of the resilient tube 20. Two opposite end edges of the resilient tube 20 each axially protrude to form a pair of locating portions 23 spaced from and facing to each other.

Referring to FIG. 2 again, each of the second connectors 30 is L-shaped and has a connection board 31 and a fastening dock 32. The connection board 31 defines a substantially rectangular locating aperture 310 penetrating therethrough for mounting one pair of locating portions 23 of the resilient tube 20 therein. The fastening dock 32 defines a plurality of fastening apertures 320 each penetrating therethrough.

Figure 5:
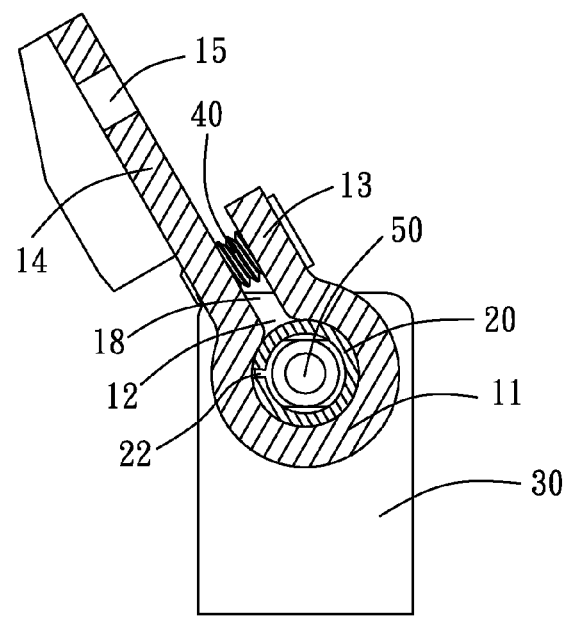
FIG. 5 is a cross-sectional view of the hinge of FIG. 1.

Referring to FIG. 1, FIG. 2 and FIG. 5, in assembly, the pivotal sleeve 11 of the first connector 10 is pivotally sleeved to the resilient tube 20 with an outer periphery of the resilient tube 20 pressing against an inner periphery of the pivotal sleeve 11 on account of the resiliency produced by the slot 22 of the resilient tube 20, and then the fastening elements 40 are fastened into the first locking holes 16 and the corresponding second locking holes 17 to bind the locating strip 13 and the coupling flap 14 together. The second connectors 30 are mounted to two opposite ends of the resilient tube 20 by means of the two pairs of locating portions 23 being inserted in the corresponding locating apertures 310 respectively, and then the resilient stoppers 50 are respectively plugged in the corresponding locating apertures 310 between the pair of corresponding locating portions 23 for preventing the second connectors 30 from falling off the resilient tube 20 and further securing the second connectors 30 to the resilient tube 20. In this embodiment, the fastening elements 40 are screws.

Figure 6:
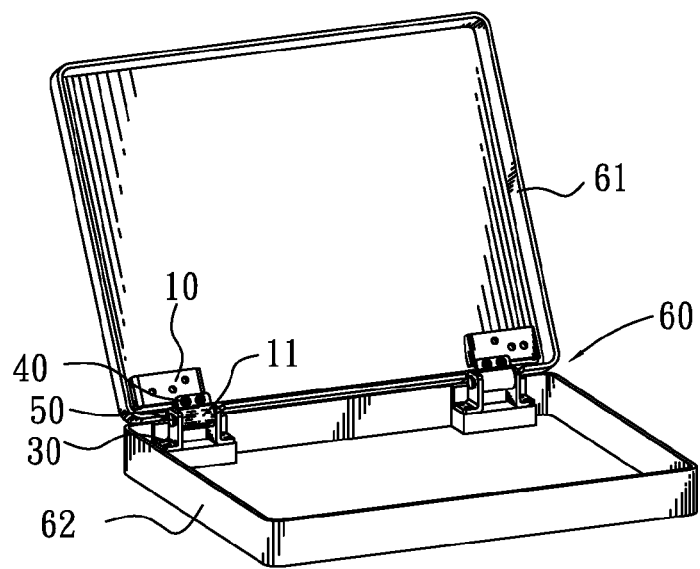
FIG. 6 is a perspective view showing that the hinge of FIG. 1 is used in a notebook computer, wherein the notebook computer is in an opened state to expose the hinges.
Figure 7:
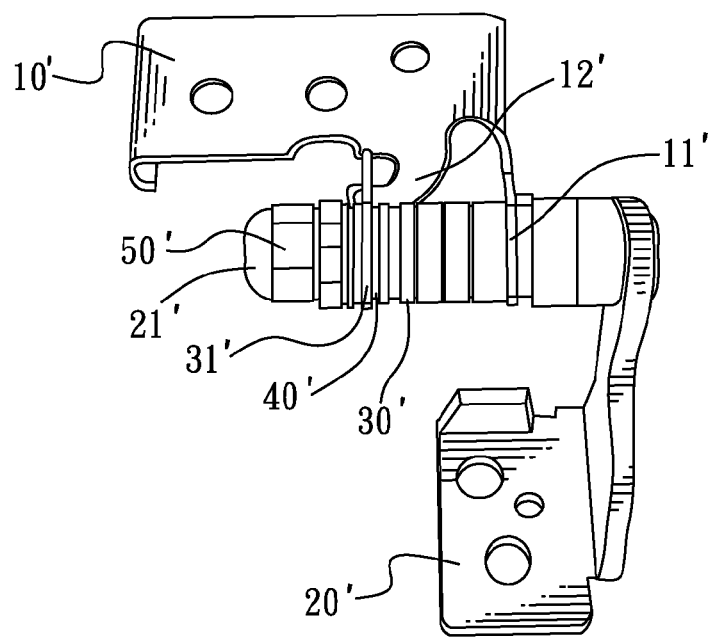
FIG. 7 is a perspective view of a hinge according to the prior art.

Referring to FIG. 6, it shows that the hinge of the present invention is used in a notebook computer 60 as an example. The notebook computer 60 includes a host body 62 and a display apparatus 61 pivoted to the host body 62 by means of the hinges, wherein the coupling flap 14 of the first connector 10 is secured to the display apparatus 61 by means of the fastening holes 15, and the fastening docks 32 of the second connectors 30 are secured to the host body 62 by means of the fastening apertures 320. So the display apparatus 61 may be swiveled about the resilient tube 20 of the hinge for folding and unfolding relative to the host body 62.

Referring to FIG. 5 and FIG. 6 again, in the process of opening and closing the display apparatus 61 relative to the host body 62, the pivotal sleeve 11 of the first connector 10 is driven by the coupling flap 14 to rotate about the resilient tube 20 that produces a friction resistance force between the outer periphery of the resilient tube 20 and the inner periphery of the pivotal sleeve 11 by means of the resiliency of the resilient tube 20 helping encourage firm contact between the resilient tube 20 and the pivotal sleeve 11. So the display apparatus 61 may be positioned at any desired angle relative to the host body 62. Furthermore, the friction resistance force between the outer periphery of the resilient tube 20 and the inner periphery of the pivotal sleeve 11 can be further strengthened by means of further screwing the fastening elements 40 to narrow the space 18 between the locating strip 13 and the coupling flap 14, namely shorten the diameter of the pivotal sleeve 11.

As described above, the hinge of the present invention mainly includes the first connector 10, the resilient tube 20, the second connectors 30 and the fastening elements 40, and utilizes the friction resistance force between the resilient tube 20 and the pivotal sleeve 11 of the first connector 10 to make the display apparatus 61 positioned at any desired angle relative to the host body 62. So the hinge of the present invention has simple structure and assembly, and further reduces the manufacture cost.

What is claimed is:

1. A hinge adapted to be connected between a display apparatus and a host body of a foldable electronic appliance for permitting the display apparatus to be swiveled relative to the host body, the hinge comprising:

a first connector having a hollow pivotal sleeve split axially in a direction of a longitudinal axis thereof to define a channel that enhances the resiliency of the sleeve, a coupling flap and a locating strip which are spaced from each other in a parallel relation and connected with two opposite edges of the channel respectively, the coupling flap being fastened to the display apparatus of the electronic appliance;

a resilient tube pivotally received within and circumferentially biasing against the pivotal sleeve of the first connector to produce a friction resistance force therebetween;

two second connectors fastened to two opposite ends of the resilient tube and further fastened to the host body of the electronic appliance so that the display apparatus may be positioned at any desired angle relative to the host body by means of the friction resistance force between the resilient tube and the pivotal sleeve; and a fastening element for holding the locating strip and the coupling flap closely together and adjust a space between the locating strip and the coupling flap to further regulate the friction resistance force between the resilient tube and the pivotal sleeve;

wherein the two opposite ends of the resilient tube respectively define a pair of locating portions spaced from and facing to each other, one end of each of the second connectors defines a locating aperture for fastening the pair of corresponding locating portions therein.

2. The hinge as claimed in claim 1, wherein the resilient tube is split axially in a direction of a longitudinal axis thereof, to define a slot that enhances the resiliency of the resilient tube to strengthen the circumferential bias against the pivotal sleeve of the first connector for further strengthening the friction resistance force between the resilient tube and the pivotal sleeve.

3. The hinge as claimed in claim 1, further comprising two resilient stoppers, the locating aperture further penetrating through the respective second connector, each of the resilient stoppers being plugged in the corresponding locating aperture between the pair of corresponding locating portions for securing the corresponding second connector to the resilient tube.

4. The hinge as claimed in claim 1, wherein the channel of the first connector is opened along a generatrix of the pivotal sleeve and communicates with the space between the locating strip and the coupling flap.

5. The hinge as claimed in claim 1, wherein the locating strip of the first connector defines a first locking hole and the coupling flap defines a second locking hole corresponding to the first locking hole, the fastening element is fastened into the first locking hole and the corresponding second locking hole.

6. The hinge as claimed in claim 5, wherein the fastening element is a screw.

7. The hinge as claimed in claim 1, wherein the coupling flap of the first connector defines a plurality of fastening holes each penetrating therethrough, and each of the second connectors defines a plurality of fastening apertures each penetrating therethrough.

* * * * *